G. W. SNYDER & L. W. SNYDER.
Car-Wheels.

No. 136,392.

Patented March 4, 1873.

Witnesses:
J. Snowden Bell.
Thos. A. Burtt.

George W. Snyder,
Lewis W. Snyder,
by their Atty.
Horace Binney, 3rd

UNITED STATES PATENT OFFICE.

GEORGE W. SNYDER, OF PORT CARBON, AND LEWIS W. SNYDER, OF LYKENS, PENNSYLVANIA.

IMPROVEMENT IN CAR-WHEELS.

Specification forming part of Letters Patent No. 136,392, dated March 4, 1873.

*To all whom it may concern:*

Be it known that we, GEORGE W. SNYDER, of Port Carbon, in the county of Schuylkill and State of Pennsylvania, and LEWIS W. SNYDER, of Lykens, in the county of Dauphin, in the said State, have invented a new and useful Improvement in Car-Wheels, Pulleys, and other Metal Wheels; and we do hereby declare the following to be a full, clear, and exact description thereof, which will enable others skilled in the art to which it appertains to make and use the said improvement, reference being had to the accompanying drawing which forms a part of this specification, and in which—

Figure 1:
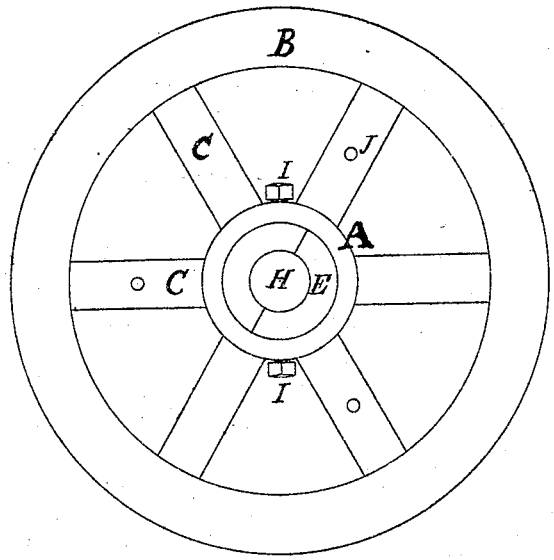
Figure 2:
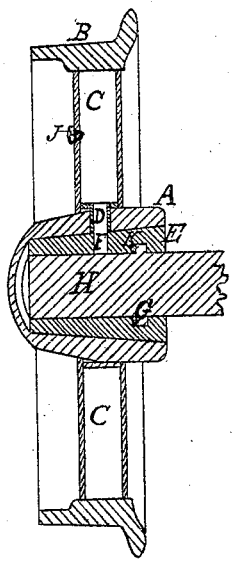

Figure 1 is a side view of a car-wheel constructed according to our invention, and Fig. 2 a diametrical section thereof.

The same parts are denoted by the same letters in both the figures.

Our invention consists in a novel construction of metal wheels to prevent breakage by expansion and contraction, and also to diminish wear and facilitate lubrication.

This invention is applicable to all wheels and pulleys which revolve loosely on shafts or axles. In applying it to car-wheels, which are liable to be greatly heated by the friction of the brake-shoe on the tread of the wheel, so that the expansion and contraction caused by such heating and subsequent cooling strain the wheel more or less violently, and frequently crack and break it between the hub and the tire, where it is weakest, we make the wheel, in order to resist such strain, with tubular wrought-iron spokes C C, as shown in the drawing, the hub A and rim B being of cast-iron and the tread chilled in the usual manner.

In the form shown in Figs. 1 and 2, the hub A is cast with a number of channels, D D, communicating with the interior of the tubular spokes. We prefer to make three such channels, communicating with alternate spokes. Within the hub is the bushing E, of brass or other suitable material, which has an equal number of holes or channels, F, forming a continuation of channels D when placed so that their openings coincide, as shown in Fig. 2. The bushing is divided longitudinally, consisting of two equal and similar pieces, and is countersunk for the reception of collar G on the axle H, as shown in Fig. 2.

In putting the wheel on the axle the halves of the bushing are first put round the axle and then inserted into the hub, care being taken to make the channels D and F coincide, for which purpose the ends of the hub and bushing are marked. The bushing is then secured in this position by means of the set-screws I I, which pass through the hub.

Countersinks may be made in the bushing to enable the set-screws to hold it more firmly.

The channels D, as already stated, open into the interior of the spokes; and those spokes which communicate with such channels are made with openings J, which may be closed by screws or similar devices. Oil is poured in through these openings and flows through D and F to the axle, as shown in Fig. 2.

To prevent leakage and waste of oil a leather or other suitable washer, K, may be used.

What we claim as our invention, and desire to secure by Letters Patent of the United States, is—

1. A car-wheel composed of the cast-iron rim A, the cast-iron hub B constructed with one or more channels D, and the wrought-iron tubular spokes C C, operating as receptacles of oil for lubricating the axle.

2. The combination, substantially as shown and described, of tubular spokes C, hub B constructed with channels D, and bushing E constructed with channels F, and countersink to receive the collar G.

GEORGE W. SNYDER.
LEWIS W. SNYDER.

Witnesses:
JOHN L. SHISSLER,
E. H. WILLSON.